(12) United States Patent
Pryor

(10) Patent No.: US 6,453,748 B1
(45) Date of Patent: Sep. 24, 2002

(54) BORON NITRIDE PIEZORESISTIVE DEVICE

(75) Inventor: Roger W. Pryor, Bloomfield Hills, MI (US)

(73) Assignee: Wayne State University, Detroit, MI (US)

( * ) Notice: Subject to any disclaimer, the term of this patent is extended or adjusted under 35 U.S.C. 154(b) by 0 days.

(21) Appl. No.: 09/464,015

(22) Filed: Dec. 15, 1999

(51) Int. Cl.$^7$ .............................. G01L 9/06; H01L 29/00
(52) U.S. Cl. ........................ 73/727; 73/721; 257/536; 257/537
(58) Field of Search ...................... 73/725, 726, 727, 73/708, 721, 720, 719; 257/417, 536, 537

(56) References Cited

U.S. PATENT DOCUMENTS

| | | | |
|---|---|---|---|
| 3,931,573 A | 1/1976 | Hopfer | |
| 4,071,838 A | * 1/1978 | Block | 338/47 |
| 4,350,741 A | 9/1982 | Hasegawa et al. | |
| 4,511,877 A | 4/1985 | Nishikawa et al. | |
| 4,578,611 A | 3/1986 | Sadler | |
| 4,935,627 A | 6/1990 | Zimmerman et al. | |
| 5,145,741 A | * 9/1992 | Quick | 428/402 |
| 5,334,344 A | 8/1994 | Hegner et al. | |
| 5,420,419 A | 5/1995 | Wood | |
| 5,483,920 A | 1/1996 | Pryor | |
| 5,539,236 A | 7/1996 | Kurtz et al. | |
| 5,632,854 A | * 5/1997 | Mirza et al. | 438/53 |
| 5,646,474 A | 7/1997 | Pryor | |
| 5,681,997 A | * 10/1997 | McHale et al. | 73/727 |
| 5,837,607 A | * 11/1998 | Quick | 438/437 |
| 6,271,576 B1 | * 8/2001 | Quick | 257/588 |

* cited by examiner

*Primary Examiner*—Benjamin R. Fuller
*Assistant Examiner*—Andre Allen
(74) *Attorney, Agent, or Firm*—John A. Miller; Warn, Burgess & Hoffmann, P.C.

(57) ABSTRACT

A piezoresistive pressure sensor that makes use of n-type boron nitride as the piezoresistive material. The boron nitride enables the sensor to provide suitable performance in hostile environments. The sensor includes a titanium substrate covered with a diamond insulator layer. An n-type boron nitride piezoresistive element is deposited on the diamond layer, and is electrically connected to electrical contacts. The electrical contacts are electrically connected to a resistive measurement system for determining the resistance of the piezoresistive element. In an alternate embodiment, the boron nitride piezoresistive material is used in a micobolometer for a focal plane array.

25 Claims, 2 Drawing Sheets

BORON NITRIDE PIEZORESISTIVE DEVICE

BACKGROUND OF THE INVENTION

1. Field of the Invention

This invention relates generally to a piezoresistive device employing boron nitride as the piezoresistive material and, more particularly, to a piezoresistive pressure sensor employing boron nitride as the piezoresistive material for use in hostile environments, and a piezoresistive microbolometer employing boron nitride as the piezoresistive material for use in focal plane arrays and the like.

2. Discussion of the Related Art

The automotive industry needs a more stable, high temperature pressure sensor for sensing pressure in cylinder heads, brake fluid systems and other hostile environments. Currently available commercial pressure sensors cannot adequately operate in these types of automotive environments because their performance is unstable in such environments. For example, conventional pressure sensors are not applicable to sense the pressure within a vehicle cylinder and in vehicle brake lines because of the high heat. In order to meet increasing legislative and design demands, new sensors must be developed to monitor these types of environments.

One known pressure sensor is a micro-machined pressure sensor formed by an integrated processing technique employing a silicon substrate, where oxide isolated piezoresistors are mounted directly to a silicon diaphragm. Silicon piezoresistors have a gage factor that can range between 50 and 200, which is a significant improvement over metals. These sensors have been adequate for sensing pressure in non-hostile environments, but in high temperature and high impulse environments, the high leakage currents and brittle silicon diaphragm are generally not adequate. The best known sensor for use in a hostile environment has been silicon piezoresistors grown on sapphire bonded to a titanium substrate. However, these sensors can have serious drift problems due to annealed stresses, which can cause zero drift when in use, thus limiting their ability to be effective in hostile environments.

Piezoresistivity is the property of a material that results in the observed change in the resistance of the material under the influence of an applied stress. To a first approximation, piezoresistivity can be viewed as a primarily geometric effect resulting from the applied stress. Consider a fine wire of uniform cross-section. If $\rho$ is the resistivity ($\Omega m$), l is the length (m), and a is the area of the cross-section ($m^2$), the resistance $R=\rho l/a (\Omega)$.

If a uniform stress ($\sigma(Nm^{-2})$) is applied along the length of the wire, then:

$$dR/d\sigma=d(\rho l/a)/d\sigma=\rho/a \cdot \partial l/\partial \sigma - \rho l/a^2 \cdot \partial a/\partial \sigma + l/a \cdot \partial \rho/\partial \sigma \quad (1)$$

If the change in the resistance is then compared to the initial value of resistance, the result is:

$$dR/R=\partial l/l - \partial a/a + \partial \rho/\rho \quad (2)$$

For a circular wire, $$a=\pi \cdot d^2/4 \text{ and } -\partial a/a=-2\partial d/d \quad (3)$$

Since the change in diameter (d) of the wire is related to the change in length (l) of the wire by Poisson's Law, then:

$$v=\partial d/d/\partial l/l \quad (4)$$

Then equation (2) can be rewritten as:

$$dR/R=\partial l/l(1+2v)+\partial \rho/\rho \quad (5)$$

For metals, the change in the resistivity ($\rho$) can be related to the change in the volume (V) through the Bridgeman Constant (C) as follows:

$$\partial \rho/\rho=C \cdot \partial V/V \text{ and } \partial V/V=\partial l/l(1-2v) \quad (6)$$

Combining equations (5) and (6) gives:

$$dR/R=\partial l/l\{(1+2v)+C(1-2v)\}=G\partial l/l \quad (7)$$

where G is the gage factor. Typical values for v and C in metals are $v\approx 0.3$ and $C\approx 1.13$ to 1.15. This yields a value of G for metallic strain gages of 2.0–2.3.

In the case of semiconducting materials (Si, Ge, BN), the final term ($\partial \rho/\rho$) in equation (5) dominates. Because the underlying crystalline structure determines the directional sensitivity of the conduction process in a semiconductor, the resistivity changes from a scalar to a tensor. Experimentally, the nine coefficients that are normally found in such a tensor have thus far been found to reduce to six and also to form a symmetric tensor. With an applied electric field, the relationship is as shown below.

$$\begin{bmatrix} E_1 \\ E_2 \\ E_3 \end{bmatrix} = \begin{bmatrix} \rho_1 \rho_6 \rho_5 \\ \rho_6 \rho_2 \rho_4 \\ \rho_5 \rho_4 \rho_3 \end{bmatrix} \begin{bmatrix} i_1 \\ i_2 \\ i_3 \end{bmatrix} \quad (8)$$

Boron niitride (BN) has become an important material in the electronics industry because it is a wide band gap semiconductor material with high thermal conductivity and chemical inertness. Semiconducting thin film boron nitride has been developed for application as an electron emitting cold cathode material for use in vacuum displays and the like. U.S. Pat. No. 5,646,474 issued to Pryor Jul. 8, 1997 discloses a cold cathode of this type. Boron nitride exists in several crystalline structures, and may be amorphous, polycrystalline or a single crystal when used in the cathode emitter.

It has been suggested by the present invention that boron nitride be used as the piezoresistive material in a pressure sensor for use in hostile environments. It is an object of the present invention to provide such a sensor.

SUMMARY OF THE INVENTION

In accordance with the teachings of the present invention, a piezoresistive device is disclosed that makes use of boron nitride as the piezoresistive material. In one embodiment, the device is a pressure sensor where the boron nitride enables the sensor to provide suitable performance in hostile environments. The sensor can include a titanium substrate covered with a diamond insulator layer. An n-type boron nitride piezoresistive element is deposited on the diamond layer and is electrically connected to electrical contacts. The sensor is then electrically connected to a suitable sensor circuit.

In an alternate embodiment, the device can be a microbolometer. A cantilevered substrate including a boron nitride piezoresistive element configured within a suitable dielectric extends over a well. The differences in the coefficient of thermal expansion between the dielectric and the piezoresistive element causes the dielectric to curl in response to increased temperature. This curling of the substrate causes the resistance of the boron nitride element to change, which can be measured and give an indication of the temperature.

BRIEF DESCRIPTION OF THE INVENTION

DETAILED DESCRIPTION OF THE PREFERRED EMBODIMENTS

The following discussion of the preferred embodiments directed to a piezoresistive device using boron nitride as the piezoresistive material is merely exemplary in nature and is in no way intended to limit the invention or its applications or uses.

Figure 1:
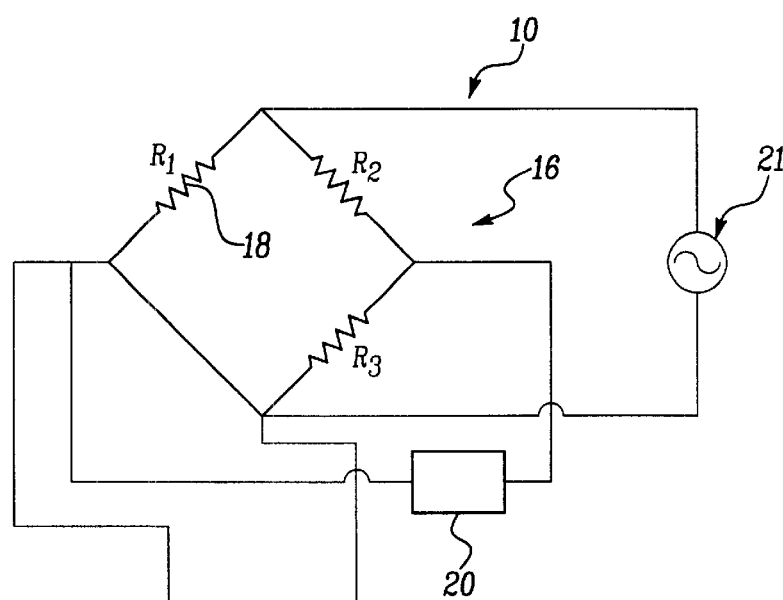
FIG. 1 is a schematic diagram of a pressure sensor circuit employing a pressure sensor according to the invention.

Semiconductor pressure sensors have been used in the art to sense pressure for a variety of systems. FIG. 1 is a schematic-type diagram of a sensor system 10 employing a pressure sensor 12, according to an embodiment of the present invention. The system 10 has particular application for use in a hostile automotive environment, such as sensing the pressure in an engine cylinder or brake line. The system 10 includes an orifice 14 than extends into the automotive system. The sensor 12 is positioned across the orifice 14, and is secured thereto by any suitable securing device, such as a high temperature glue. Therefore, changes in pressure within the orifice 14 directly affects the sensor 12. Particularly, pressure changes within the orifice 14 cause the sensor 12 to flex up and down, bending the piezoresistive element therein, and thus changing its resistance.

The sensor 12 is electrically connected to a Wheatstone Bridge circuit 16, and is one of the resistive elements therein. As is known to those skilled in the art, the bridge circuit 16 includes three resistor elements 18 ($R_1$–$R_3$), whose resistances are known. The sensor 12 is connected across the bridge circuit 16, and the bridge circuit 16 is used to measure the electrical resistance of the sensor 12 by comparing it to the known resistance established by the resistor elements 18. A power source 21 is electrically connected across the circuit 16 and provides power to the circuit 16. A control device 20 measures the balance of the circuit 16. The change in resistance of the piezoresistive element unbalances the bridge circuit 16, which is sensed by the control device 20. The resistance of the sensor 12 is converted to a representation of the pressure within the orifice 14. Therefore, the sensor 12 provides a way of measuring the pressure within the orifice 14. The use of a Wheatstone Bridge in pressure sensing circuits of this type is well known in the art.

Figure 2:
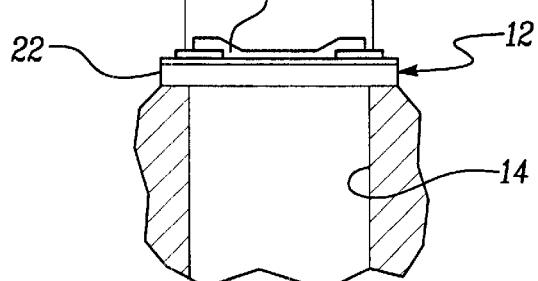
FIG. 2 is a top view of a piezoresistive pressure sensor, according to an embodiment of the present invention.
Figure 2:
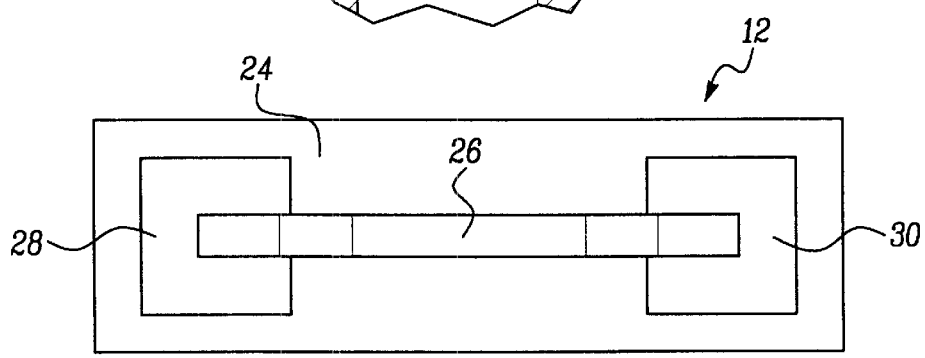
Figure 3:
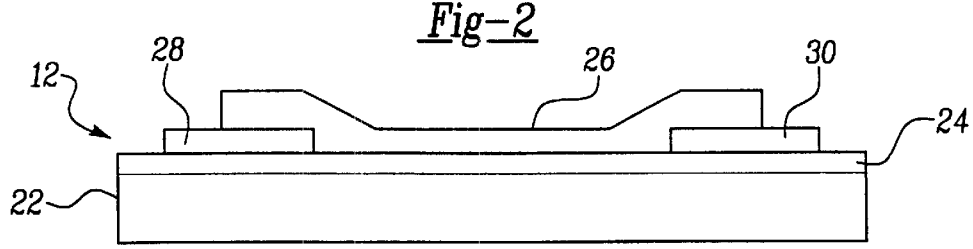
FIG. 3 is a cross-sectional view of the piezoresistive pressure sensor shown in FIG. 2.

FIG. 2 is a top view and FIG. 3 is a cross-sectional view of the sensor 12 separated from the system 10. The sensor 12 is a micro-machined semiconductor device that includes a substrate 22 covered by an insulator layer 24. A piezoresistive element 26 is positioned on the insulator layer 24. Electrical contacts 28 and 30 are also positioned on the insulator layer 24, and are electrically connected at opposite ends of the element 26. The contacts 28 and 30 are electrically connected to the resistors 18, as shown, to connect the element 26 to the bridge circuit 16. The various layers and such of the sensor 12 are deposited and etched by well know semiconductor fabrication techniques.

According to the invention, the piezoresistive element 26 is made of boron nitride. Boron nitride offers several advantages as a piezoresistive material for use in a hostile environment. Boron nitride is desirable because it is a wide band gap semiconductor having a high thermal conductivity and a chemical inertness. The boron nitride element 26 may be single crystalline, amorphous or polycrystalline. It may be hexagonal or cubic, or a combination of crystalline structures or allotropes and phases. Preferably, the element 26 is polycrystalline boron nitride in which the individual crystallites are cubic boron nitride. In one embodiment, the polycrystalline boron nitride has an average grain size of from about 0.01 to 10,000 microns and a range of grain sizes from about 0.001 to about 10,000 microns, and more preferably an average grain size from 0.1 to 100 microns with a range in grain sizes from 0.01 to 1000 microns.

In one embodiment, the boron nitride is doped with a suitable dopant to make it an n-type material to reduce the band gap and make it conductive at room temperature. Suitable n-type dopants include carbon, Lithium and sulfur. The element 26 can be doped to a concentration of about $10^{16}$ cm$^3$ to $10^{22}$ cm$^3$, and preferably $10^{18}$ cm$^3$ to $10^{20}$ cm$^3$. The boron nitride element 26 is deposited on the layer 24, but the layers 24 and 26 do not need to be heteroepitaxial. The boron nitride element 26 can be deposited on the substrate 22 in different manners, such as disclosed in the '474 patent. These processes include reactive laser ablation deposition and a suitable sputtering technique. In one embodiment, the element 26 is about 4 cm long, about 3 mm wide and about 85 nm thick.

The substrate 22 and the insulator layer 24 can be made of any material suitable for a pressure sensor of this type and compatible with the boron nitride of the element 26. In one embodiment, the substrate 22 is made of titanium and the insulator layer 24 is made of diamond. Diamond is preferred because it has low drift and a low coefficient of expansion. Additionally, diamond has a lattice parameter that matches boron nitride, and therefore they bond well together. The substrate 22 and the layer 24 can be about 5.5 cm in length. Also in the preferred embodiment, the contacts 28 and 30 are made of molybednum, however, any suitable metal contact can be used. The size of the contracts 28 and 30 can be 1.2 cm×1 cm and be 300 nm thick.

The diamond insulator layer 24 can be made by any suitable semiconductor fabrication process. For example, the layer 24 can be made synthetically through a deposition process, preferably CVD, by ionization of a carbon feedstock gas. The layer 24 may be a single crystalline material, but is preferably a polycrystalline diamond when the boron nitride element 26 is polycrystalline. The layer 24 is preferably from about 500 nm thick and 1.2 cm wide, and can be doped with a suitable n-type dopant to have a concentration from about $10^{16}$ cm$^3$ to $10^{22}$ cm$^3$. The n-type dopant can be added to the diamond material during the CVD deposition process by including a phosphorous containing gas in the deposition chamber.

The use of boron nitride as a piezoresistive material can be extended to other piezoresistive devices. Microbolometers are known in the art to be used as individual pixel elements in a focal plane array (FPA). An example of such a microbolometer can be found in U.S. Pat. No. 5,420,419. A bolometer is a device for detecting and measuring small amounts of thermal radiation. A bolometer is typically a slab of material with an electrical property, usually resistance, that changes with temperature.

Figure 4:
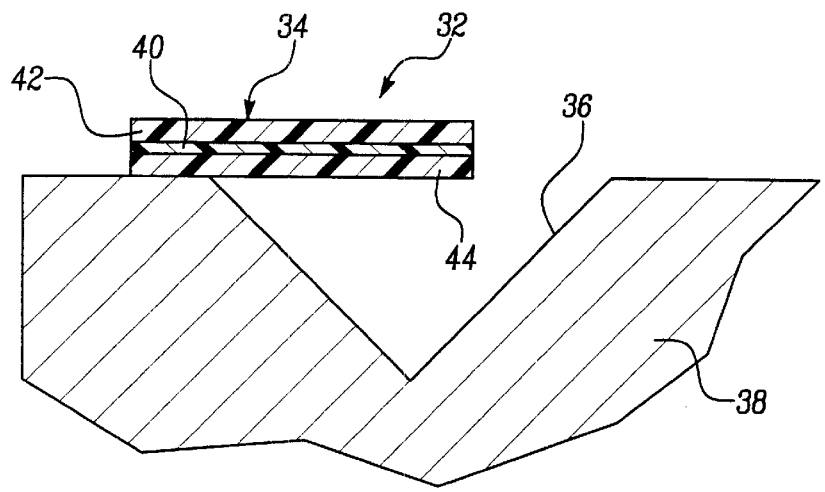
FIG. 4 is a perspective view of a microbolometer employing a piezoresistive element, according to an embodiment of the present invention.

According to the invention, a microbolometer is made with a combination of a dielectric and a piezoresistive element. FIG. 4 shows a perspective view of a microbolometer 32 including a cantilever 34 positioned over a well 36 formed in a semiconductor substrate 38. The cantilever 34 is made of a dielectric material, such as silicon dioxide ($SiO_2$), glassy carbon or hexagonal boron nitride. A boron nitride piezoresistive element 40 is configured between dielectric layers 42 and 44 of the cantilever 34 so that it is isolated from the environment. The piezoresistive element 40 can be doped with an n-type material, and have the various compositions and such as described above for the element 26.

Figure 5:
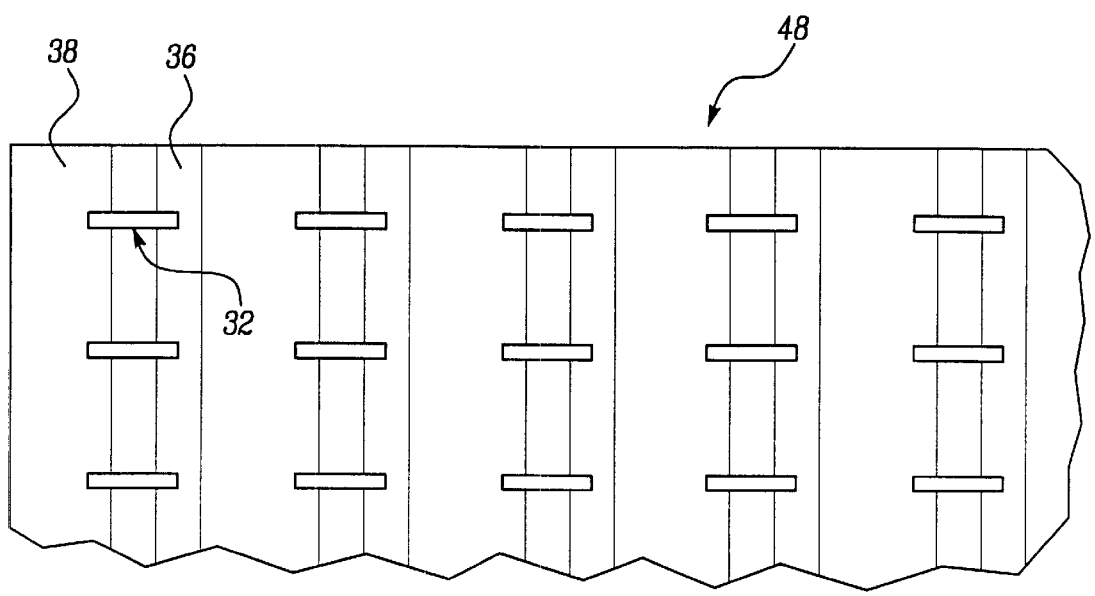
FIG. 5 is a focal plane array employing a plurality of the microbolometers shown in FIG. 4.

The microbolometer 32 is part of a focal plane array (FPA) 48 as shown in FIG. 5. The FPA 48 can be used to provide a thermal image, for use, for example, in thermal imaging cameras. Because the dielectric material of the cantilever 34 has a different coeffecient of thermal expansion than the piezoresistive element 40, incident heat on the microbolometer 32 causes the cantilever 34 to bend. When the cantilever 34 bends, the piezoresistive element 40 stretches, changing its resistance. By applying a current to the element 40, the resistance of the element 40 can be measured, providing an indication of the incident heat thereon. Microbolometers can be employed in the FPA 48 that are not exposed to incident heat to provide a reference signal for signal-to-noise purposes.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A piezoresistive device comprising:
    a substrate; and
    a piezoresistive element positioned in combination with the substrate, said element changing its resistance in response to a flexing force on the substrate, said piezoresistive element being made,mostly of a boron nitride material.

2. The device according to claim 1 wherein the device is a pressure sensor, and the piezoresistive element is positioned to measure a change in pressure.

3. The device according to claim 2 wherein the piezoresistive element is doped with an n-type dopant.

4. The device according to claim 3 wherein the piezoresistive element is doped with carbon.

5. The device according to claim 2 wherein the piezoresistive element has a thickness of about 85 nm.

6. The device according to claim 1 wherein the boron nitride material in the piezoresistive element is selected from the group consisting of polycrystalline, amorphous, and crystalline boron nitride.

7. The device according to claim 2 wherein the substrate is made of a titanium material.

8. The device according to claim 2 further comprising an insulator layer positioned between the substrate and the piezoresistive element.

9. The device according to claim 2 wherein the insulator layer is made of a diamond material.

10. The device according to claim 2 further comprising electrical contacts made of molybednum.

11. The device according to claim 2 wherein the sensor has a gauge factor of about 200.

12. The device according to claim 2 wherein the sensor is part of a sensor system sensing cylinder pressures in a vehicle.

13. The device according to claim 1 wherein the substrate is a cantilevered member positioned over a well, and the piezoresistive element is positioned within the substrate.

14. The device according to claim 1 wherein the device is a microbolometer that senses thermal energy.

15. The device according to claim 14 wherein the microbolometer is part of a focal plane array.

16. A pressure sensor for use in hostile environments, said sensor comprising:
    a substrate;
    a diamond layer positioned over the substrate;
    a pair of electrical contacts positioned on the diamond layer;
    a piezoresistive element positioned on the diamond layer and being electrically connected to the contacts, said piezoresistive element being made of an n-type boron nitride material; and
    a sensing circuit electrically connected to the contacts and providing a measurement of the resistance of the piezoresistive element.

17. The sensor according to claim 16 wherein the boron nitride material in the piezoresistive element is selected from the group consisting of polycrystalline, amorphous and crystalline boron nitride.

18. The sensor according to claim 16 wherein the substrate is made of a titanium material.

19. The sensor according to claim 16 wherein the sensor is part of a sensor system in an automobile.

20. A microbolometer for sensing thermal radiation, said microbolometer comprising:
    a cantilevered substrate connected at one end to a support structure and extending over a well, said substrate including a dielectric layer having a coefficient of thermal expansion; and
    a piezoresistive element positioned within the substrate, said piezoresistive element being made of a boron nitride material, said piezoresistive element having a coefficient of thermal expansion that is different than the coefficient of thermal expansion of the dielectric layer, said substrate curling in response to incident heat.

21. The microbolometer according to claim 20 wherein the piezoresistive element is isolated from the environment within the substrate.

22. The microbolometer according to claim 20 wherein the microbolometer is part of a focal plane array.

23. A method of providing a pressure sensor, said method comprising the steps of:
    providing a substrate;
    depositing an insulator layer over the substrate; and
    depositing a piezoresistive layer over the insulator layer, said piezoresistive layer being made of a boron nitride material.

24. The method according to claim 23 wherein the step of depositing a piezoresistive layer includes depositing a piezoresistive layer doped with an n-type dopant.

25. The method according to claim 24 wherein the step of depositing an insulative layer includes depositing an insulator layer made of a diamond material.

* * * * *